(12) United States Patent
Kohlhéb

(10) Patent No.: US 11,485,175 B2
(45) Date of Patent: Nov. 1, 2022

(54) WHEEL HUB ARRANGEMENT FOR DRIVES WITH ROTATED DRUM

(71) Applicant: Róbert Kohlhéb, Budapest (HU)

(72) Inventor: Róbert Kohlhéb, Budapest (HU)

(*) Notice: Subject to any disclaimer, the term of this patent is extended or adjusted under 35 U.S.C. 154(b) by 0 days.

(21) Appl. No.: 17/609,076

(22) PCT Filed: May 5, 2020

(86) PCT No.: PCT/HU2020/050015
§ 371 (c)(1),
(2) Date: Nov. 5, 2021

(87) PCT Pub. No.: WO2020/225581
PCT Pub. Date: Nov. 12, 2020

(65) Prior Publication Data
US 2022/0144015 A1    May 12, 2022

(30) Foreign Application Priority Data
May 6, 2019   (HU) .................................. P1900143

(51) Int. Cl.
*B60B 27/04*   (2006.01)
*B60B 27/02*   (2006.01)

(52) U.S. Cl.
CPC .......... *B60B 27/047* (2013.01); *B60B 27/023* (2013.01)

(58) Field of Classification Search
CPC ....... B60B 27/047; B62M 25/06; F16D 41/30
See application file for complete search history.

(56) References Cited

U.S. PATENT DOCUMENTS

| 4,702,486 A | 10/1987 | Tsuchie |
| 6,158,757 A | 12/2000 | Tidcomb |
| 9,162,525 B2 * | 10/2015 | Lantos ................... B62M 25/06 |
| 2012/0032498 A1 * | 2/2012 | Klieber ................. B60B 27/047 192/64 |
| 2017/0367911 A1 | 12/2017 | Vermij et al. |
| 2020/0139758 A1 * | 5/2020 | Chen ..................... B60B 27/023 |
| 2020/0198395 A1 * | 6/2020 | Piele .................... B60B 27/023 |

FOREIGN PATENT DOCUMENTS

| AU | 493909 B2 | 6/1978 |
| CN | 206719415 U | 12/2017 |
| DE | 96534 C | 3/1898 |
| DE | 3622639 A1 | 1/1988 |
| DE | 3624324 A1 | 1/1988 |
| DE | 102004004961 A1 * | 8/2005 .......... B60B 27/023 |
| EP | 210336 A2 | 2/1987 |
| EP | 2588365 A1 | 5/2013 |
| GB | 2456077 A | 7/2009 |
| JP | 2010 246828 A | 11/2010 |

OTHER PUBLICATIONS

Written Opinion From ISA, PCT/HU2020/050015 dated Nov. 12, 2020, 7 Pages.

* cited by examiner

*Primary Examiner* — Kip T Kotter

(57) ABSTRACT

Wheel hub arrangement for a drive with rotated drum that has a stationary shaft (13); a hollow drum (19, 20) arranged by bearings around it, a wheel drum (32) that includes a hub of the driven wheel, and freewheels, inner sleeve (21, 22) which are arranged around the stationary shaft (13) by bearings, and placed partially in the cavity of the drum (19, 20). The wheel hub arrangement for a drive with rotated drum for bicycles, street stepper vehicles, wheelchairs and tricycles.

15 Claims, 11 Drawing Sheets

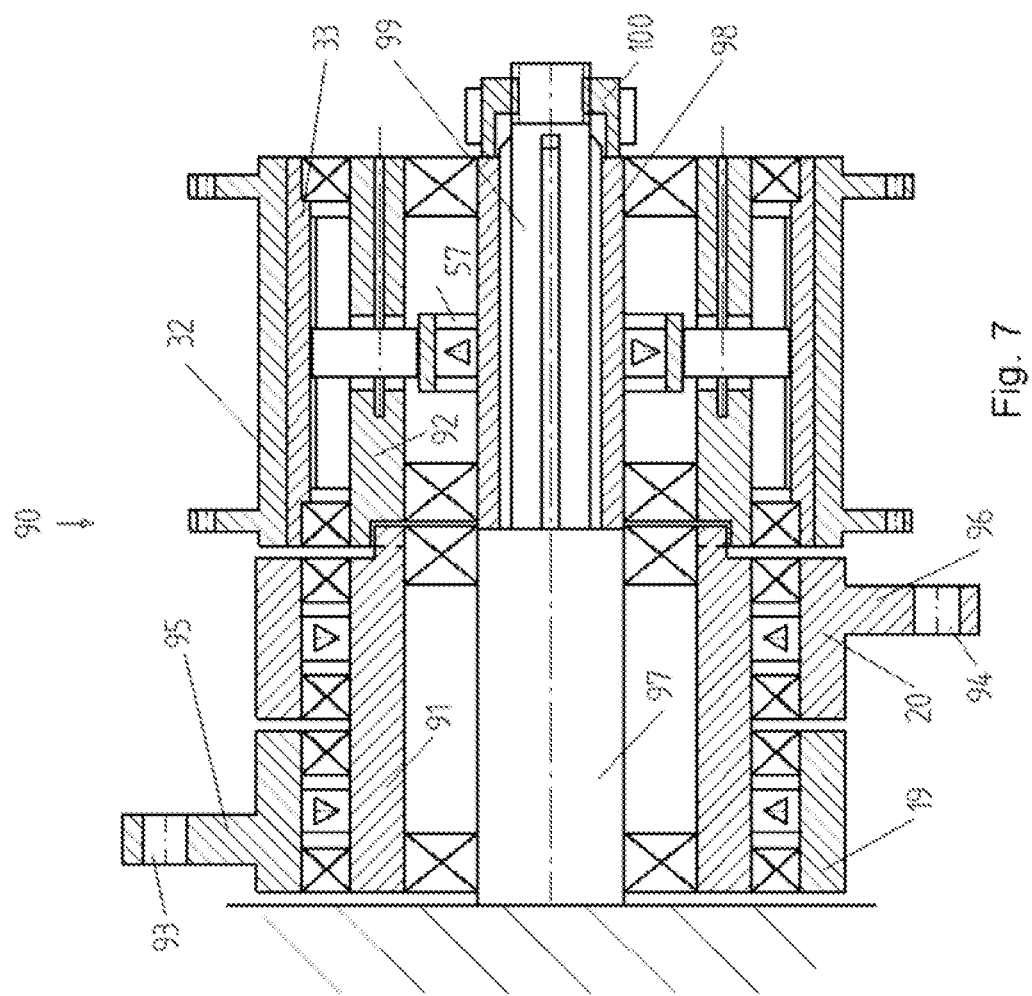

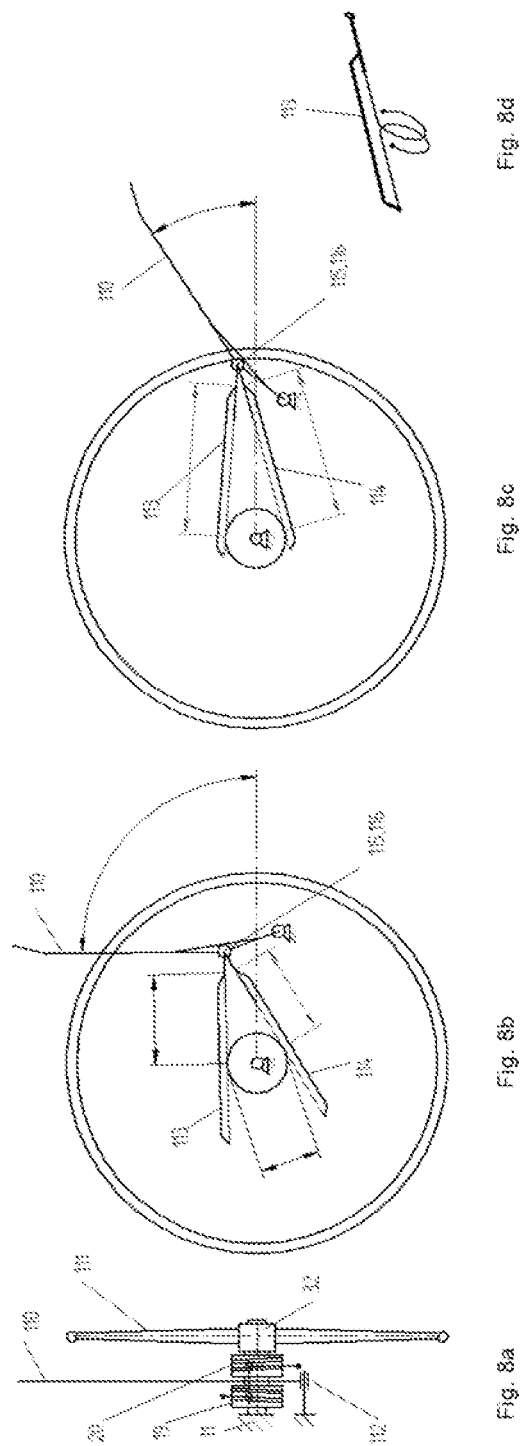

WHEEL HUB ARRANGEMENT FOR DRIVES WITH ROTATED DRUM

CROSS-REFERENCE TO RELATED APPLICATIONS

The present invention is a national stage entry of international application no. PCT/HU2020/050015, filed on May 5, 2020, which claims priority to Hungarian patent application no. P1900143, filed on May 6, 2019.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The invention relates to a wheel hub arrangement for a drive with rotated drum to be used primarily for driving a wheel of a vehicle by a subject, e.g. for bicycles, street stepper vehicles, wheelchairs and tricycles. The invention relates also to a few specific new uses of the invention.

Description of Related Art

Several types of such vehicles are known. U.S. Pat. No. 5,833,257 describes a bicycle drive, in which the rotation movement of the pedals is converted to respective swinging movement of a respective arm provided at either side of the frame, and the pulling section of such a swinging movement rotates through a rope a drum connected with the hub of the rear wheel and drives that wheel through a freewheel.

An embodiment of such a drive is described in U.S. Pat. No. 8,602,433. Here a spiral spring is placed in the interior of the hollow body of the rope wheel, and its biasing force ensures the rewinding of the rope drum and the return movement of the swinging arm, when it reverses direction. The drive disclosed in this publication cannot be used only for bicycles but also for other drive operating with human power.

U.S. Pat. No. 10,011,321 provides a drive for the first wheel of vehicles with three wheels. Here the forward-backward movement of a steering rod realizes the alternating movement which is used for the driving of respective windings wound around rope drums arranged at either sides of the driven wheel, and the torque exerted in this way drives the wheel. The return winding is provided by respective spiral springs arranged in the interior of the rope drums, but the spring bias need not ensure the return movement of the driving arm, whereby the springs move much smaller masses compared to the previous solution made for bicycles. Such a drive is preferred primarily by disabled subjects but it can be used also for fitness applications.

It is noted that the here referred manual drives can be combined with the recently preferred and fashionable electric drives.

Because the rotation of the driven drum can drive the wheel only in one of the two directions of rotation, when the drum rotates in the return direction, its connection with the driven wheel gets broken due to the use of a freewheel. The use of a freewheel has however the consequence when the driven wheel (generally during backwards motion) is rotated in reverse direction, the freewheel gets into a locked state and without a sufficient protective solution it would tend to move the drum with the mechanism thereon against the lock, which prevents the functioning of the drive.

Several drive types are known in which, just based on this problem, the driven wheel cannot be moved backwards. However backward motion is required at most of the driven vehicles, and therefore there is a need for an appropriate mechanism that releases the freewheel used for the driving when the direction of rotation of the driven wheel is reversed.

A solution to that problem is given in U.S. Pat. No. 9,162,525 in which, at both sides of the hub of the driven wheel, a rope drum is provided on which respective windings are arranged wound with opposite sense. The hollow inner space of the rope drums is occupied by the springs required for the return rotation. The rope drums are connected for their respective sides with form fitting binding to respective inner sleeves arranged in the interior space of the wheel hub between it two spoke-holding rims, and the inner sleeves are coupled by respective bearings to the stationary shaft of the wheel hub, and between the inner sleeve at the central one a freewheel is arranged that ensures return movement. The inner ring of this freewheel is fixed to the stationary shaft. The two inner sleeves are rotating together with the rope drums connected with them. On the outer mantle of the inner sleeves, separated from them by radial spaces, an intermediate sleeve is arranged which is connected to the inner sleeves by bearings. Between the respective inner sleeves and the intermediate sleeve, a respective freewheel is arranged which has opposite locking directions, because one inner ring is rotated by one of the inner sleeves and the other inner ring is rotated by the other inner sleeve, and these freewheels ensure that only that direction of rotation will be transmitted to the intermediate sleeve which corresponds to the forward direction. To the two spoke-holding rims respective outer half sleeves are connected which have an increased diameter at the central portion and provide space for a profiled inner ring, which lies in driving connection through a centrally arranged rock lever mechanism with the inner sleeves. During normal drive through this rock lever mechanism, a driving connection takes place between the intermediate sleeve and the outer half sleeves, and the driven rotation of the wheel drums is rotate the wheel through the inner and intermediate sleeves and the rock lever mechanism, and the wheel is connected with the outer half sleeves. When the driven wheel is pushed backwards, then the third freewheel gets locked and releases the engagement between the rock lever mechanism and the outer half sleeves, whereby the wheel can be pushed backwards.

Although the described mechanism allows the backward movement of the driven wheel, it has a number of drawbacks. Of them, it should be mentioned that in a concentric arrangement three sleeves are required with their respective bearings, of which the inner and the outer sleeves consist of two parts and their axial positioning requires the use of fitting and squeezing elements. The concentric arrangement of three sleeves with their respective bearings increases weight, time demand of the assembly and its costs. A further drawback of that solution is that its operation requires a drive in which respective rope drums are used at either side of the wheel drum, although there can be applications in which there is no possibility or need to have a drive at both sides.

The task of the invention is to provide a wheel hub arrangement that ensures the possibility of pushing backwards, whereas there is no need on the wheel hub for the use of three concentric sleeves, furthermore that can equally be used if the driven wheel is driven only on one side by a single driving drum, namely the wheel hub and the driven wheel can be arranged on one side of the body or the frame of the driven vehicle as a cantilever support and not only when it is held from both sides. Accordingly the task is to provide a wheel hub arrangement that is simpler and can have multiple applications.

A further task of the invention is to provide a number of new applications that have respective special advantages.

BRIEF SUMMARY OF THE INVENTION

For solving this task, a wheel hub arrangement for a drive with rotated drum is provided to be used primarily for driving a wheel of a vehicle by human power, e.g. for bicycles, street steppers or wheelchairs or driving vehicles having three wheels, that comprises a stationary shaft that can be fixed in a releasable way to at least one holding plate of the vehicle; at least one drum that has a hollow interior and connected by bearings to the shaft that can be turned in both directions; a wheel drum constituting the hub of the driven wheel that comprises spoke-holding rims at both sides, and a driving connection established between the driven hollow drum and the wheel drum that transmits the forward rotation of the hollow drum to the wheel drum and allows the rearward turning thereof independent from the movement of the wheel drum, the driving connection comprises at least a first freewheel and a releasing mechanism that comprises a second freewheel that releases the connection of the wheel drum with the hollow drum when the wheel drum is turned in backward direction, and according to the invention the driving connection comprises an inner sleeve which is coupled by bearings around the stationary shaft and it is arranged at least in part in the hollow interior of the drum and in part at the wheel drum, and the bearings of the drum and the first freewheel are arranged between the outer mantle of the inner sleeve and the interior of the drum, and the hollow cylindrical interior of the wheel drum comprises a ring arranged in this cylindrical interior and connected in a fixed way thereto or made as a single piece therewith and it is guided through bearings around a section of the outer mantle of the inner sleeve, and at least two cuts are provided in a portion of the inner sleeve which is under the ring and preferably at its central section, and the second freewheel is arranged in the interior of the inner sleeve so that in an axial position it corresponds to the position of the cuts, and in the cuts rock levers are arranged biased by springs and they are pivotally fixed around pins that bridge the cuts, and one ends of the rock levers are projecting into the interior of the inner sleeve and they are supported in recesses provided on the outer ring of the second freewheel and the other ends are abutting in one of a plurality of profiled recesses provided in the interior of the ring when the ring and the wheel drum connected to it in a rigid way are rotating in forward direction, and when the wheel drum is turned in backward direction, the rock levers get disengaged from the profiled recess of the ring by being turned by the recess of the second freewheel that gets locked in that rearward direction, whereby the engagement between the ring and the inner sleeve gets released that allows the free rearward rotation of the wheel drum.

In a preferred embodiment, the wheel hub arrangement can be mounted between two holding plates and comprises a respective driving drum at either sides, and the wheel drum is positioned between the driving drums, and the stationary shaft comprises three interconnected tubes that lead through the interior of the drums and of the wheel drum, and the inner sleeve also comprises three parts which are positioned on these tubes, they rotate together but by axial displacement they can be separated from each other.

In an alternative embodiment, the wheel hub arrangement comprises a single stationary shaft that can be fixed on a single holding plate as a cantilever, and comprises a single drum arranged at the side where it is fixed, and the inner sleeve is made of a single piece.

In this case, it is preferred if the wheel drum and the ring are made as rigidly interconnected two parts, and the wheel drum can be pulled out from the ring after a fixing connection has been released.

Electric drive can be provided in case in the interior cavity of the inner sleeve on the stationary shaft an electric motor is arranged in a part of the section between the second freewheel and the cantilever-type support, the motor has a rotor coupled to the inner sleeve and its lead out wires are lead through the interior of the shaft.

In a driving application, in the drum in a section between the end of the inner sleeve and the fixing side, a wound spring is arranged, and along the outer mantle surface of the drum a rope guiding path is provided.

The arrangement will be simpler if it comprises a single stationary shaft that can be fixed on a single holding plate (11) as a cantilever, and a single drum arranged at the side of the cantilever-type fixing, and the inner sleeve consists of a single piece.

In case of certain types of drives, it is preferred if the arrangement comprises a single stationary shaft that can be fixed on a single holding plate as a cantilever, and two drums arranged adjacent to each other on the side where the arrangement is fixed in a cantilever-type manner, and in the interior of each of the drums the bearings and a first freewheel are arranged, furthermore, the inner sleeve consists of a single piece, and the wheel drum and the inner ring are rigidly interconnected but made of two parts, and the wheel drum can be pulled out of the ring following the release of a fixing connection.

In this case, it is preferred if the wheel drum is fixed by a releasable lock mounted on the ring at the outer part of the wheel drum and fitted in a recess made in the ring.

In certain cases, it can be preferred if the wheel drum constitutes a per-se known self standing unit and it is mounted on an inner shaft provided on the stationary shaft directly past the outer end of the inner sleeve and of the ring, and between the wheel drum and the ring, a torque transmitting connection, preferably a geared connection is provided.

In certain applications, it can be preferred if on the single or both of the drums an outwardly extending radial projection is provided, in which a bore is made for receiving a pivotal pin of a driving rod.

In a preferred application which is capable of driving the large wheel of a wheelchair that has a hub made as the wheel hub arrangement, in a predetermined distance in front of the large wheel, an axis of rotation is provided around which a driving arm is pivoted for displacement in forward-backward and reverse direction, and at a predetermined height of the driving arm through a respective pivot or pivots at least one driving member is connected, which is longer than the greatest distance between the axis of rotation and the at least one drum in the wheel hub arrangement, and to the ends of the driving member the ends of a stretched rope are fixed, which is wound with a predetermined number of turns around the drum associated with the concerned one of the driving members.

In this case it is preferred if the axis of rotation is fixed at the lower end of the driving arm close to the ground, and has a pair of driving members which have windings with opposite sense wound around the mantle of their associated drums.

In an alternative embodiment of this application the axis of rotation is fixed at a predetermined distance above the lower end of the driving arm, and has two driving members having respective pivots connected to the driving arm at respective predetermined distances with opposite sense counted from the axis of rotation.

In another similar application in a predetermined distance in front of the large wheel an axis of rotation is provided around which a driving arm is pivoted for displacement in forward-backward and reverse direction, to which at a predetermined distance through a pivot a first end of at least one rod is coupled, and the other end of the rod is coupled by a pivotal connection to the bore provided on the projection extending out from the drum.

A further possibility lies in when the axis of rotation is fixed at a predetermined distance above the lower end of the driving arm, and has two rods having respective pivots connected to the driving arm at respective predetermined distances with opposite sense counted from the axis of rotation.

BRIEF DESCRIPTION OF THE SEVERAL VIEWS OF THE DRAWINGS

The invention will now be described in connection with preferable embodiments thereof, wherein reference will be made to the accompanying drawings. In the drawing:

FIG. 7 is the longitudinal sectional view of an embodiment that can be coupled to pivoted rods;

FIGS. 8*a*, 8*b*, and 8*c* are sketches of a first utilization by a driving bow member;

DETAILED DESCRIPTION OF THE INVENTION

Figure 1:
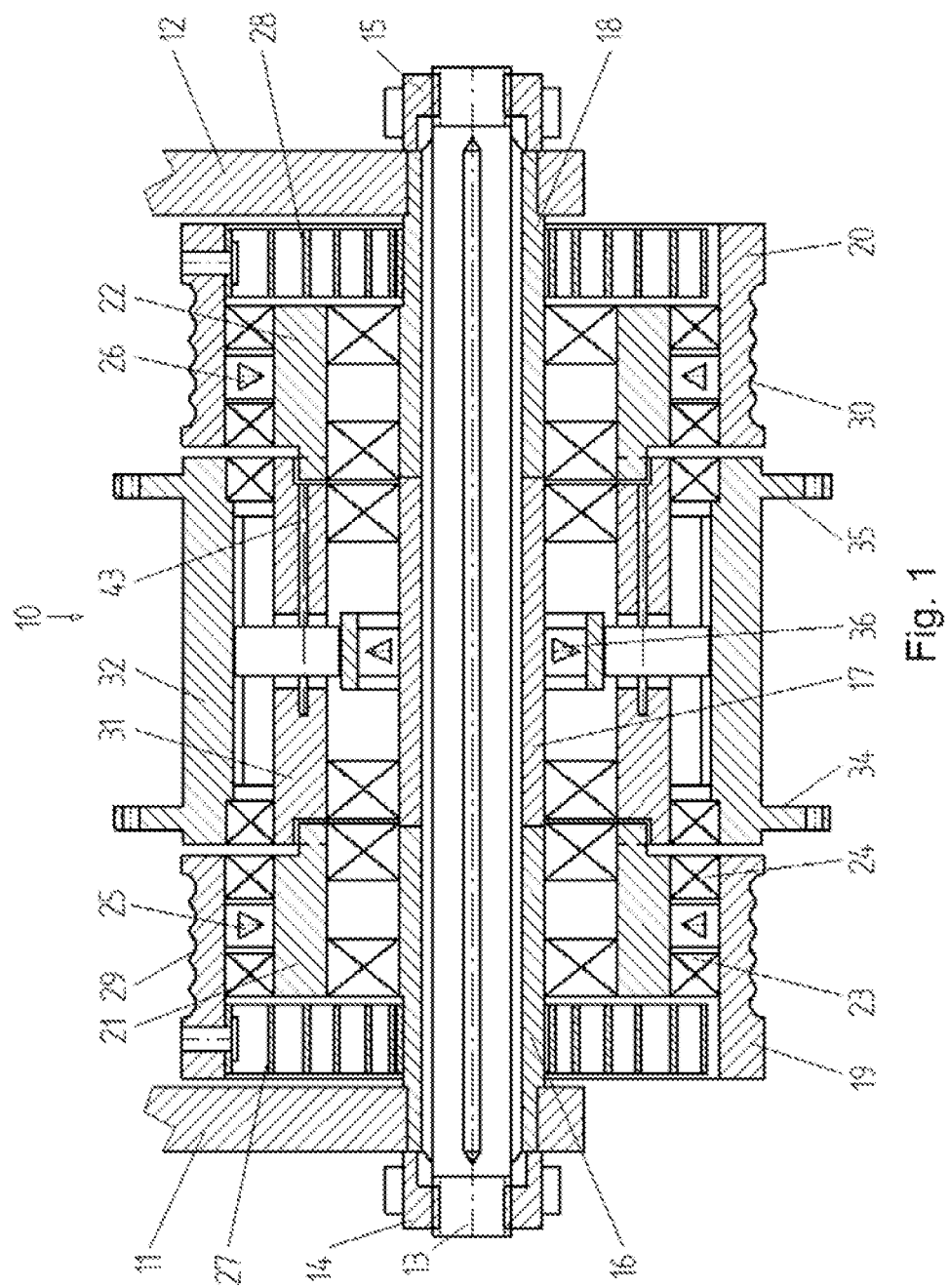
FIG. 1 shows the elevation sectional view of the wheel hub arrangement with two fixing sides.

Reference is made to FIG. 1, which shows the sectional elevation view of the wheel hub arrangement 10 of an embodiment according to the invention in which the wheel shaft is fixed at both ends. The function of this embodiment has the closest resemblance to the function of the wheel hub disclosed in the previously referred U.S. Pat. No. 9,162,525. The wheel hub arrangement 10 shown in FIG. 1 is fixed in a removable way to a pair of holding plates 11, 12 of the frame of a vehicle not shown in the drawing by having a shaft 13 provided with threads at the two end sections and threaded nuts 14, 15 that can be positioned on these threaded end sections. The shaft 13 has preferably longitudinal ribs and around the shaft 13 three inner tubes 16, 17 and 18 are arranged in a line behind one another which have axial grooves fitting to and receiving the ribs of the shaft 13, whereby they are arranged in a fixed and stable way on the shaft 13. On the left and right side of the wheel hub arrangement 10 respective drums 19, 20 with hollow interiors are provided in which irrespective inner sleeves 21, 22 are arranged coupled by bearings to the tubes 16, 18 respectively. The drum 19 is coupled to the inner sleeve 21 by bearings 23, 24 and a first freewheel 25. It is noted that the two bearings 23, 24 and the first freewheel 25 can be realized by a single constructional part. In the right side, the drum 20 is arranged by using similar elements around the tube 18, and out of these elements only second freewheel 26 was provided with a reference numeral. In the interior of the drums 19, 20 at their sides close to the respective holding plates 11, 12 respective wound springs 27, 28 arranged with their inner ends to the tubes 16 and 18, and their outer ends are attached to the associated drum 19 and 20. The task of the springs 27, 28 is to turn the associated drum back following the concerned drum has been turned along its driving path. Finally it is mentioned that around the outer mantle surface of the drums 19, 20 for the placement of a respective driving rope, a respective rope guiding path 29, 30 is provided.

The two outer ones of the inner sleeves 21, 22 are coupled respective ends of a similar central sleeve 31. This connection is a torque transmitting connection, which can be realized by using form fitting and engaging teeth or by any other way capable of the transmission of torque. Following the assembly of the arrangement the inner sleeves 21, 22 and 31 can be realized as if they were a single sleeve.

In the outermost portion of the central part of the wheel hub arrangement 10 a wheel drum 32 is arranged. The wheel drum 32 is a hollow sleeve that has a specially shaped interior design at the middle portion, and its profile is shown in FIG. 2*a* as the shape of an outermost ring 33. At the two edges of the wheel drum 32 respective spoke-holding rims 34, 35 are provided that have a series of holes for receiving ends of the spokes of the driven wheel.

Figure 2B:
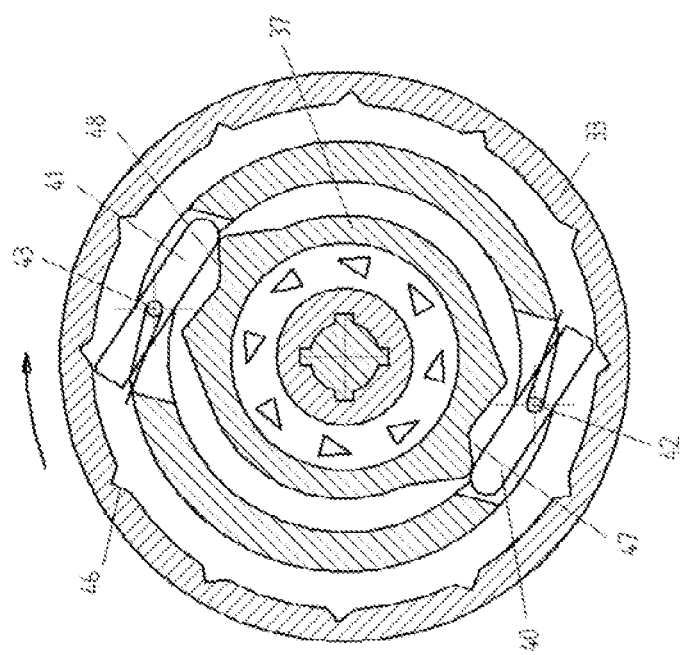
FIGS. 2*a* and 2*b* show cross sectional views at the middle of the inner sleeve 22 shown in FIG. 1.
Figure 2A:
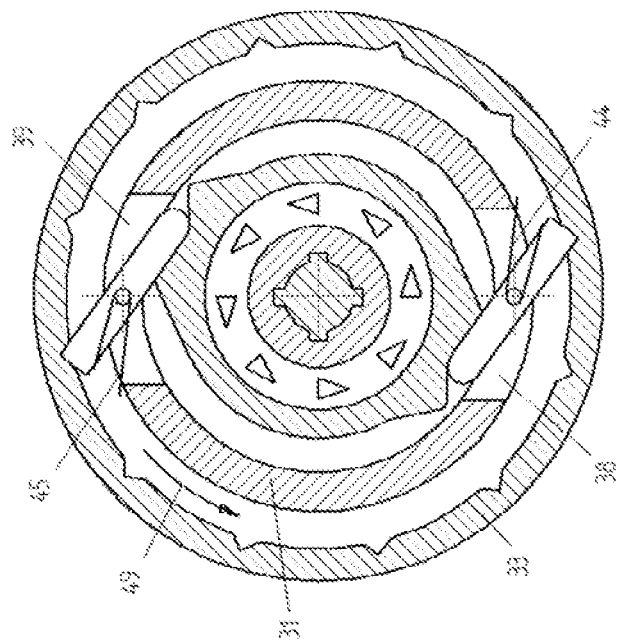

In the central part of the wheel hub arrangement 10 on the tube 17 the inner ring of a third freewheel 36 is arranged and the sectional view of the outer ring 37 of this third freewheel 36 is shown in FIGS. 2*a* and 2*b*. The locking direction of the third freewheel 36 is opposite from the locking directions of the first and second freewheels 25, 26, and it does not allow turning of its outer ring 37 when from any reason the wheel drum 32 tends to turn in rearward direction, i.e. against the driving direction.

In the middle of the inner sleeve 31 at two diametrically opposite positions respective cuts 38, 39 or windows are provided which can be observed in FIGS. 2a and 2b. In these cuts 38, 39 respective rock levers 40, 41 are arranged which can be turned around respective axial pins 42, 43 that bridge the associated one of the cuts 38, 39. The rock levers 40, 41 are biased in outward direction relative to the inner sleeve 31, i.e. towards the ring 33 of the wheel drum 32 by means of respective springs 44, 45 having V or U shape. At the inner surface of the ring 33 in even angular spacing a plurality of V-shaped recesses 46 are provided. At the outer ring 37 of the third freewheel 36 in diametrically opposing position respective asymmetric recesses 47, 48 are made which are turned from each other by 180°, and one branch of the recesses closes with the theoretic tangent line a greater angle than the other shorter branch, and this latter is also flatter.

The operation of the wheel hub arrangement 10 and the possibility of turning the wheel drum 32 in rearward direction will be described with reference to FIGS. 2a and 2b. FIG. 2a shows the case during normal drive (forward direction), and FIG. 2b shows when the wheel drum 32 is turned in backward direction. When the inner central sleeve 31 is driven by any of the drums 19, 20 in the forward direction, then it can freely rotate in the direction of arrow 49. The springs 44, 45 bias and force the rock levers 40, 41 in the outward direction. When any one of the rock levers 40, 41 arrive in a position opposite to one of the oppositely arranged recesses 46, then their outer ends will snap into the recess 46 and their front face will engage in the side wall of the recess 46 as shown in FIG. 2a and force the ring 33 and thereby the wheel drum 32 to rotate with it. The drive functions in this way in this forward direction.

If there is no drive and the ring 33 is forced to turn in the opposite direction, i.e. in the direction of arrow shown in FIG. 2b, then the rock levers 40, 41 will be pushed by the ring 33 slightly in rearward direction but the rear face of the rock levers cannot push backwards the outer ring 37 of the third freewheel 36 because it gets locked. Therefore, as a result of further pushing backwards the rear ends of the rock levers 40, 41 will be pushed outside in radial direction by the steeper edges of the recesses 47, 48 against the biasing force of the springs 44, 45, and the rock levers 40, 41 will take the angularly displaced position shown in FIG. 2b, and in this position their outer ends move out from the recesses 46, whereby the ring 33 and thereby the wheel drum 32 get released and nothing prevents its rotation in backward direction. When the backward movement is finished and the wheel starts again to rotate in forward direction, then the third freewheel 36 gets released from the previous locked state, and the position shown in FIG. 2a will soon be taken again because nothing blocks the springs 44, 45 to turn the rock levers 40, 41 outside as soon as they get into opposite position with the recesses 46.

The disassembly and assembly of the wheel hub arrangement 10 is rater simple. To achieve this, it should be taken into account that during the loosening of the nuts 14, 15 the holding plates 11, 12 will move away from each other owing to their resilience (or they can be moved away from each other), and following the pulling out of the shaft 13, the tube 17 can be pulled out, and the full wheel drum 32 can be moved out from between the drums 19, 20. A preferred field of application of the here outlined wheel hub arrangement 10 is the use thereof at the driven wheel of the vehicle designed as taught in U.S. Pat. No. 10,011,321.

The wheel hub arrangement 10 is substantially simpler than the solution described in that U.S. Pat. No. 10,011,321, because there is no need for three separate concentrically arranged sleeves with their respective bearings, and more radial space will remain for the placement of the bearings and of the freewheels, and there is no need for the axially separated and divided design of the arrangement.

Figure 3:
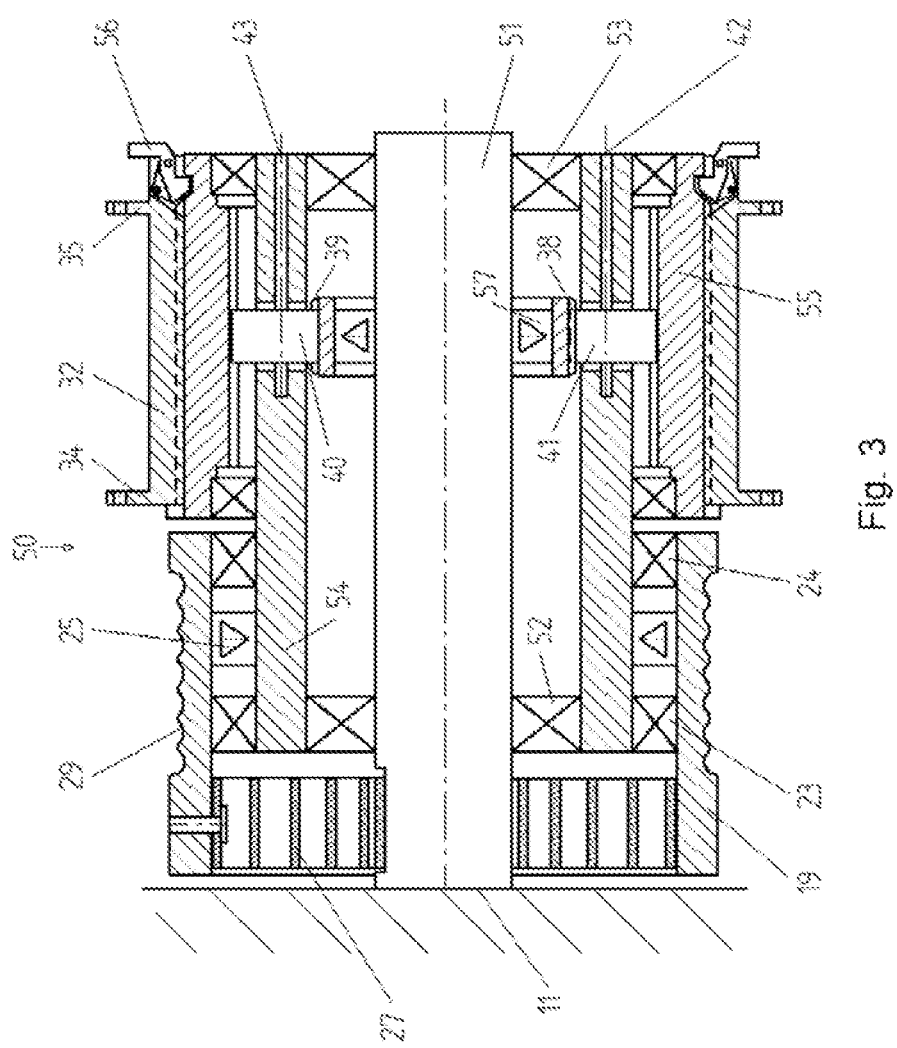
FIG. 3 is the elevation sectional view of an embodiment fixed as a cantilever.

Reference is made now to FIG. 3, which shows the elevation sectional view of a further wheel hub arrangement 50. With regard to the high degree of similarity with the wheel hub arrangement 10 shown in FIG. 1, the part performing identical function were designated with the same reference numbers.

A characteristic of this wheel hub arrangement 50 is that the mechanical holding takes place by a cantilever, i.e. only from one side, therefore the arrangements held by the holding plate 11 shown in the left side of the drawing, and a single shaft 51 is fixed to the holding plate 11. For the case of simplicity, the way how this attachment is made and the closure of the outer (right hand side) end of the wheel hub arrangement 50 have not been shown because they can be realized in any conventional way. The shaft 51 which is preferably a tubular shaft is stationary and it performs the role of the tubes 16 and 17 described in the previous embodiment.

On the shaft 51 and inner sleeve 54 is arranged by means of bearings 52 and 53 and the inner sleeve 54 perform alone the function of the inner sleeves 21 and 22 of the previous embodiment. On the left portion of the mantle of the inner sleeve 54 similar to the previous embodiment the drum 19 is attached by means of the bearings 23, 24, and the rotation in a single direction is ensured by the first freewheel 25. In the drum 19 between the shaft 51 and the drum 19 a fixed wound spring 27 is arranged that ensures the return rotation of the drum 19 and the bias of a rope (not shown) that can be wound on the rope guiding path 29.

The wheel drum 32 is slightly different from the embodiment shown earlier, because it has a cylindrical hollow cavity a sleeve 55 is arranged that has a profile shown in FIG. 3 and in the central part it is provided with the recesses 46 (as shown in FIGS. 2a and 2b). The sleeve 55 is coupled through bearings to the inner sleeve 54 which enables its free rotation with respect to the sleeve 54. At the outer mantle of the sleeve 55 there are provided a plurality of (or only a single) longitudinal ribs, and in the interior of the wheel drum 32 conforming longitudinal grooves are provided, whereby the wheel drum 32 can be attached by a longitudinal movement on the sleeve 55 and these parts will be interconnected in a stable and rigid way. The assembly and disassembly of the wheel drum 32 (and of the driven wheel connected thereto by the spokes) is enabled by the release of a lock 56.

In the inner sleeve 54 substantially at a position that corresponds to the centre of the wheel drum 32, the two cuts 38, 39 are arranged, and at the same place there is provided a second freewheel 57 pulled on the shaft 51 that takes the role of the third freewheel 36 in the previous embodiment, and its design is identical therewith. The rearward movement of the driven wheel is ensured by the same mechanism using the rock levers as in case of the previous embodiment which comprises the two rock levers 40, 41 and the associated holding pins 42, 43.

The operation of the wheel hub arrangement 50 can be easily understood based on the knowledge of the operation of the previous embodiment, because the forward turning of the drum 19 turns the inner sleeve 54 in forward direction since then the first freewheel 25 is locked, and the mechanism with the rock levers will turn the wheel drum 32 in forward direction, since the rock levers 40, 41 engage and move the recesses 46. When the drum 19 is turned back by means of the wound spring 27, the first freewheel is in an unlocked state and this return movement does not act on the inner sleeve 54. When the wheel drum 32 is turned in backward direction, the second freewheel 57 gets locked and this causes turning of the rock levers and will disengage from the recesses 46 and cannot block the rearward rotation of the wheel drum 32.

The structure of the wheel hub arrangement 50 is simpler and cheaper than the wheel hub arrangement 10, but has the same way of operation and it can be used for driving a wheel which can be attached to one side of a vehicle and can be driven with a separate drive.

Figure 4:
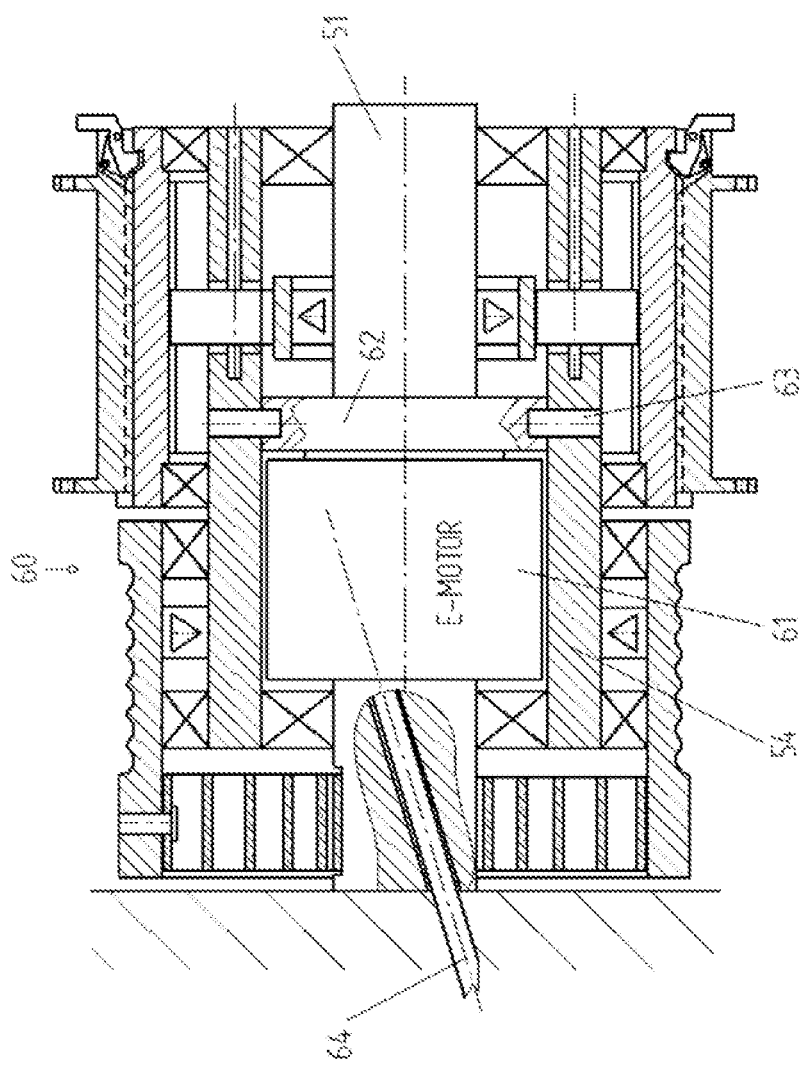
FIG. 4 shows the version of the wheel hub arrangement shown in FIG. 3 complemented by an electric motor.

Reference is made now to FIG. 4, which shows the sectional elevation view of a further wheel hub arrangement 60 which is rather similar to the previously shown wheel hub arrangement 50. Here only those parts were provided with new reference number which are not present or are different from FIG. 3.

The difference lies in that here the ring like space between the inner sleeve 54 and the shaft 51 has been utilized in which a tubular motor 61 has been placed that provides a complementary drive, wherein the stator is fixed on the shaft 51 and the rotor 62 is connected through pins or rivets 63 to the inner sleeve 54 and can drive it in forward direction. Electrical lead out wires 64 of the motor 61 are led through bores provided in the shaft 51.

The wheel hub arrangement can provide in addition to the mechanical drive a complementary electric drive, and its operation is identical with that of the wheel hub arrangement 50.

Figure 5:
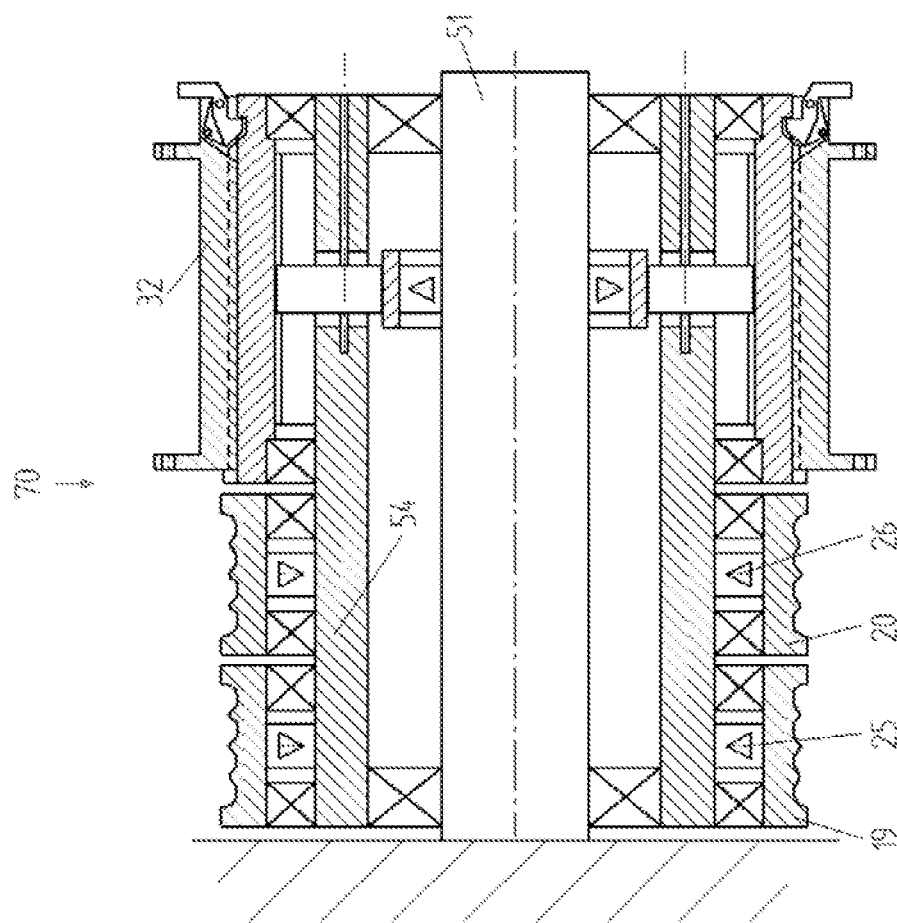
FIG. 5 shows the elevation sectional view of an embodiment of the cantilever type and using two drums.

Reference is made now to FIG. 5, which shows the sectional elevation view of a wheel hub arrangement 70. Separate reference numbers were given to parts that are different from the parts of FIG. 3.

The difference at this wheel hub arrangement 70 lies in that beside each other two drums 19 and 20 are arranged on the inner shaft 54 through bearings, wherein the bearing comprise a first and a second freewheel 25, 25 and both of the lock in forward direction, i.e. when the drums 19 and 20 rotate in forward direction, then they drive the inner sleeve 54. A further difference lies in the lack of the wound springs 27, 28. It is noted, if the axial size of the wheel hub arrangement 70 is increased, then in the drum 19 a wound spring can be placed, but there exist drive systems which do not need the function of return winding ensured by the wound spring. A few of such applications will be shown in connection with separate examples.

Figure 6:
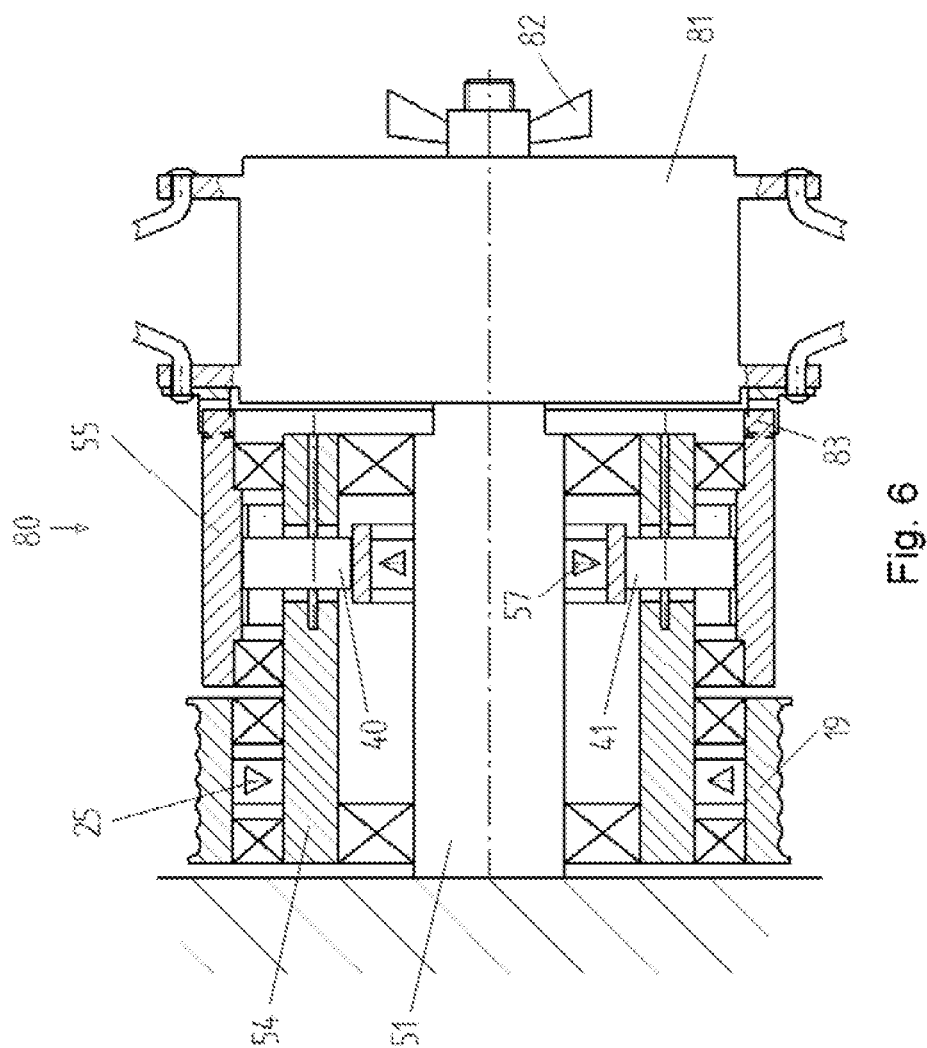
FIG. 6 is the elevation sectional view showing the connection to a conventional wheel hub.

Reference is made now to FIG. 6, which shows the sectional elevation view of a wheel hub arrangement 80. Reference numbers were given here only to parts that differ from the wheel hub arrangement 50 shown in FIG. 3.

In this embodiment there is only a single drum 19, in which there is no wound spring, but if it would be a need for such function the spring can be arranged if the axial size is increased. A substantial difference lies in that the design of the driven wheel need not be changed, i.e. instead of the wheel drum 32 a conventional wheel drum 81 can be used. In this case the shaft 51 will be longer and its outer diameter should match the inner diameter of the wheel drum 81 and has a threaded end section on which preferably a butterfly nut 82 can be threaded that enables the assembly and disassembly of the wheel drum 81 and with it the driven wheel.

In this case, the sleeve 55 is not encircled by the wheel drum 81 from the outside but it engages adjacent to it, preferably by means of matching cogs 83 meeting at the neighboring side faces. The cogs will engage each other when the wheel drum 81 is assembled on the shaft 51.

Reference is made now to FIG. 7, in which the elevation sectional view of a wheel hub arrangement 90 has been shown. Reference number was given only to parts that are different from the wheel hub arrangements 50 and 70 shown in FIGS. 3 and 5.

This wheel hub arrangement 90 differs in a number of important details from the wheel hub arrangement 70 shown in FIG. 5. Here there are also two drums 19, 20 arranged through bearings around an inner sleeve 91 which differs from the inner sleeve 54 in that it is separated in axial direction into two parts, so that the inner sleeve 91 can be connected in axial direction with inner sleeve 92, but it can also be separated from it with all the assembled components thereon. The inner sleeves 91, 92 are provided with matching engagement e.g. spur gears, therefore in the arrangement shown in FIG. 7 they are rotating together and from the point of view their functions they take the task of the inner sleeve 54 shown in FIG. 5.

Turning now to the drums 19, 20, they are not provided with a rope guiding path but from each of them respective projections 95 96 extend out at one side which are provided with a respective bore 93. 94. The drive takes place by means of pivoted rods fitted in the bores 93, 94 (not shown in FIG. 7).

In the wheel hub arrangement 90, the design and fixing of the stationary shaft is solved by using a pair of tubular shafts 97, 98 which are preferable provided with axial grooves and through their interior a rod 99 is lead through which has matching longitudinal ribs and the rod 99 has a threaded end portion which can be fastened by a nut 100, and by the release of the nut 100 the tubular shaft 98 can be pulled out with the parts assembled thereon. The tubular shaft 97 can also be made as one piece with the rod 99.

In the interior of the wheel drum 32 the ring 33 is designed as a sleeve in the central part of which the recesses 46 shown in FIG. 2 are made, and the ring 33 is coupled to the inner sleeve 92 through bearings.

From the point of view of driving the wheel hub arrangement 90 functions just as the wheel hub arrangement 70 shown in FIG. 5, i.e. in assembled state the forward turning of the drums 19, 20 turns also the inner sleeves 91, 92 in forward direction, and the rock levers lead trough the two cuts in the inner sleeve 92 ensure the turning of the ring 33, with which the assembled wheel drum 32 and the driven wheel rotate together. When the wheel drum 32 is turned in backward direction, the second freewheel 57 gets locked and the rocking mechanism releases the engagement with the ring 33 and nothing will prevent the rearward turning. The advantage of the wheel hub arrangement 90 lies in that there is no need for the lock 56, because by means of releasing the nut 100 the driven wheel can be pulled out in axial direction from the rod 99.

The wheel hub arrangements 10, 50, 60, 70, 80 and 90 described so far were identical concerning their basic principle of operation but they had different fields of applications and ways how they can be assembled and disassembled. Based on the teaching a man skilled in the art can make further embodiments which differ in small details, and the preferred embodiments shown can be used at a number of applications.

In all of the applications referred to in the description of the prior art portion one or more of these embodiments of the wheel hub arrangement can be used mostly without any modification.

In FIGS. 8a to 11, examples will be shown how the wheel hub arrangement according to the invention can be used in a preferred way in fields of applications which are different from previous known fields of uses.

In FIGS. 8b and 8c, kinematic sketches are shown how a large wheel of a wheelchair can be driven by a drive using rods, wherein the movement of a driving arm 110 in any direction (i.e. both at the forward and backward displacements) can equally drive the large wheel. FIG. 8a is the view of FIG. 8b when projected from right.

FIG. 8a shows the wheel hub arrangement 70 shown in FIG. 5, in which the cantilever type holding plate 11 is constituted by the frame of a wheelchair of a disabled subject, and the wheel drum 32 is the hub of the right large wheel 111 of the wheelchair. In FIG. 8a it cannot be seen but the driving arm 110 can be turned or moved by hand around an axis of rotation 112 both in forward and backward directions, and the axis of rotation 112 is fixed to the frame of the wheel chair in front and below the axis of the large wheel 111. Furthermore, the upper end of the driving arm 110 is in the height of the hand(s) of the disabled subject and designed so that it can be moved forward and backward in a comfortable way. In FIG. 8a one can see two drums 19 and 20 and on both of them respective windings of a driving rope can be seen.

In FIG. 8b, the driving arm 110 is in the most rearward position and in FIG. 8c it is in the most forward position, and during the driving movement it can be moved between these two extreme positions, but the movement can occur in any smaller angular range within these limits. At 25-35% of the height of the driving arm 110 pivots 115, 116 indicated in the drawing only by a small circle are arranged and respective bow-like driving members 113, 114 are pivotally coupled to the driving arm 110. The design of the driving members 113, 114 is shown in an enlarged scale in FIG. 12 of the previously referred U.S. Pat. No. 5,833,257 and its operation is also described here. The driving members 113, 114 are rather similar to the bow of a violin in which the two ends of the bow are interconnected by a driving rope of which a winding is provided around the drum associated with the concerned driving member, and one end of the rope is biased by an appropriate biasing element (e.g. utilizing the resilience of the bow by means of a threaded bolt) maintains the rope always in stretched state. The schematic design of the driving member 113 is shown in FIG. 8d. If the driving member 113 is pulled by the driving arm 110 in forward direction, then the direction of the winding is such that it turns the drum 19 under the winding in forward direction, and this will rotate the large wheel 111 also in forward direction as explained earlier. When the driving member 113 is moved backwards it will turn the winding in opposite direction and this rotation will take place without any obstacle, i.e. without any effort due to the presence of the first freewheel attached to the drum 19.

The direction of the winding on the other driving member 114 has an opposite sense, therefore the drum 20 will rotate backwards when the adjacent drum 19 rotates in forward direction, and rotates forward when the driving arm 110 moves backward. In FIGS. 8b and 8c the arrows oriented close to horizontal indicate the two possible extreme positions of the driving members 113 and 114, and the length of the displacement of the winding is the difference of the length between these positions.

It is preferred if the number of turns of the winding is by one or two turns greater than this changing rope length. From the rear extreme position shown in FIG. 8b when the driving arm 110 is moved forward, the drum 19 rotates in forward direction and the number of turns on the winding on the drum 20 will decrease. In forward movement of the driving arm 110 the driving is ensured by the winding on the drum 19. When the driving arm 110 is pulled in backward direction, the drum 20 will rotate in forward direction, i.e. it drives and the winding on the other drum 19 deceases.

The arrangement described here utilizes the movement of the driving arm 110 in either direction for driving. If the strength of the disabled subject is such that he can exert only smaller forces in a direction, then there is a possibility that the pivots 115, 116 associated with the respective driving members 113, 114 are fixed to higher or lower portions of the driving arm 110. In a higher arrangement a given arm displacement is associated with a higher length of rope displacement, and the speed will be higher, but it will require higher forces, and in lower arrangement the opposite events will take place. If the disabled subject can exert force only in one direction only, then out of the drums 19, 20 one can be left out, and the use of only a single driving member is sufficient. This design renders possible also the simplification of the wheel hub arrangement.

Figure 9C:
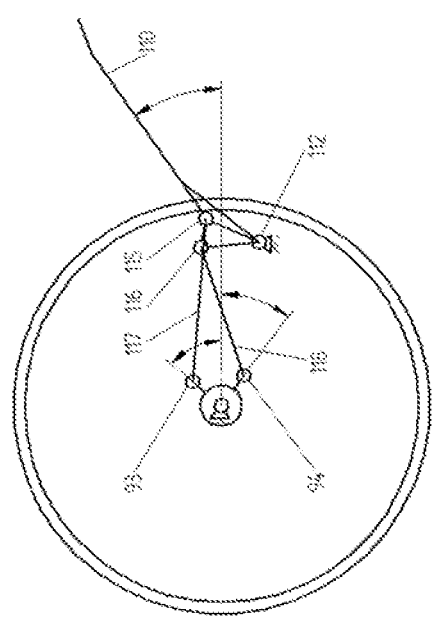
FIGS. 9*a*, 9*b*, and 9*c* show sketches of a first application using pulling rods.
Figure 9B:
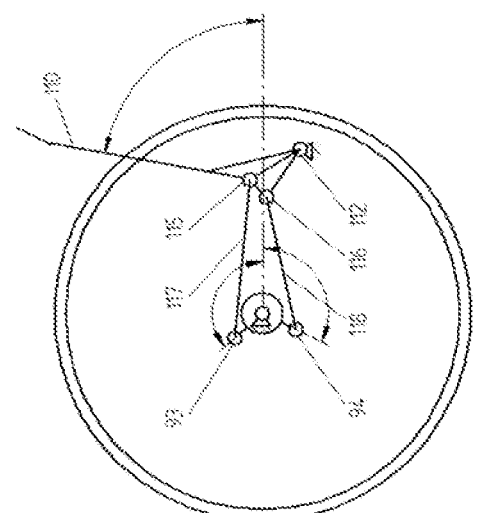
Figure 9A:
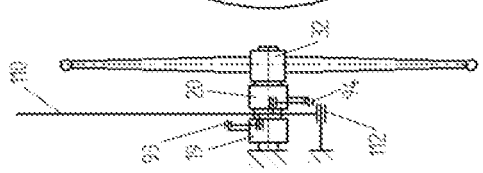

Reference is made now to FIGS. 9a, 9b and 9c, wherein the heel hub arrangement 90 shown in FIG. 7 can be used.

In this embodiment, the principle of the drive is similar to the previous embodiment, but there is no need of using ropes, windings and specially designed driving members, because the same result can be ensured by rods 117, 118 having pivotal connections at both end regions. The rear ends of the rods 117, 118 are coupled to the wheel hub arrangement 90 (in the drawing the rear ends) through respective pivots to the bores 93, 94 made in the projections 95, 95, and their front ends are coupled to pivots 115, 116 fixed to opposite sides of the driving arm 110, and the rods 117, 118 are arranged behind each other in a direction normal to the plane of the drawing and their respective movements do not block each other. In FIGS. 9b and 9c, the pivots on the front ends of the rods 117, 118 are separately shown, but their height can be even identical. The interpretation of the drawing has improved by the separate illustration of the pivots 115, 116 and here they do not cover each other as in case of FIG. 8.

With appropriate dimensioning a full thrust of the rod 117 will turn the associated drum at most by 120° to 150°, i.e. the rod 117 moves always in the upper half space, whereas the rod 118 moves in the lower half space. Otherwise, the drive is exactly the same as in case of the previous embodiment because the forward movement of the driving arm 110 turns the drum 19 by means of the rod 117 in forward direction, i.e. it drives, and by virtue of the fact that the rod 118 is arranged through the bore 94 in the lower part, the same movement turns the drum 20 in rearward direction, when it does not drive. When the driving arm 110 is moved in backward direction, the directions of the movements get reversed. The driving transmission ration can be changed if the heights of the pivots 115, 116 are adjusted to take different values. Here it is also possible to use only a single rod and a single drum.

Figure 10B:
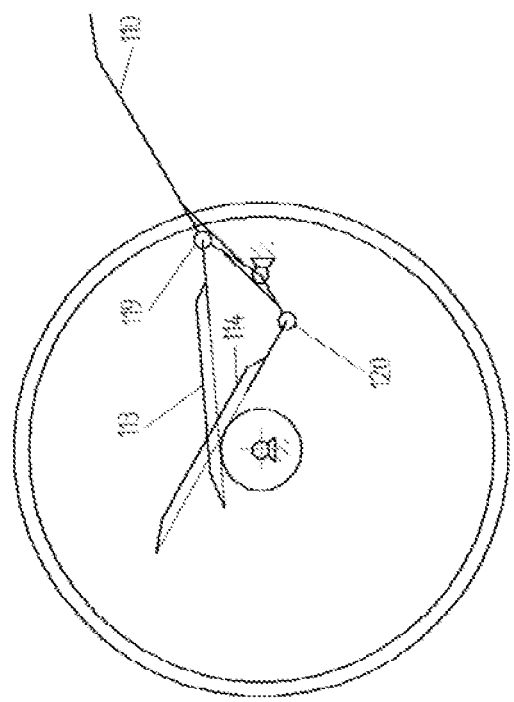
FIGS. 10*a* and 10*b* are sketches of a second embodiment using driving bow members.
Figure 10A:
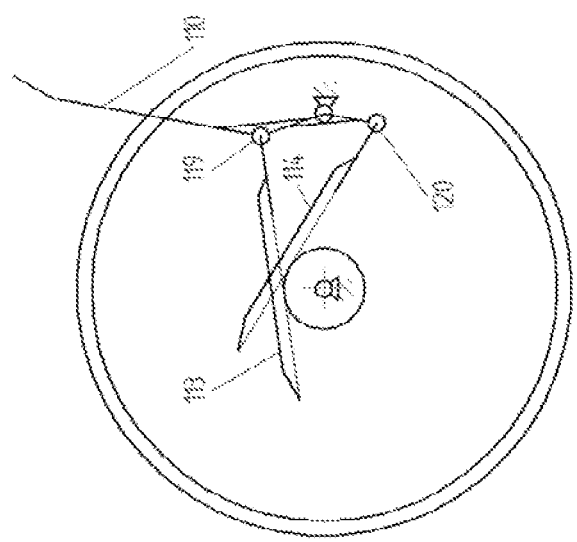

Reference is made now to FIGS. 10a and 10b which show a drive which is substantially similar to that shown in FIGS. 8a to 8c. The difference lies in that the pivotal axis of the driving arm 110 is connected to a higher point of the wheelchair, and the driving arm 110 is realized as a double-armed lever, i.e. it has respective pivotal connection points 119 and 120 above and under the axis of rotation 112, to which the frontal ends of the driving members 113, 114 can be connected. Here the driving members 113, 114 move along paths arranged behind each other normal to the plane of the drawing therefore they cannot disturb each other. A difference relative to the embodiment of FIGS. 8*a* to 8*c* is constituted by the fact that here the winding directions on the two driving members need not be made opposite because of the circumstance that they are coupled to opposite arms of the doubled armed lever at the pivots 119, 120 and this automatically ensures the displacements in opposite directions.

Figure 11B:
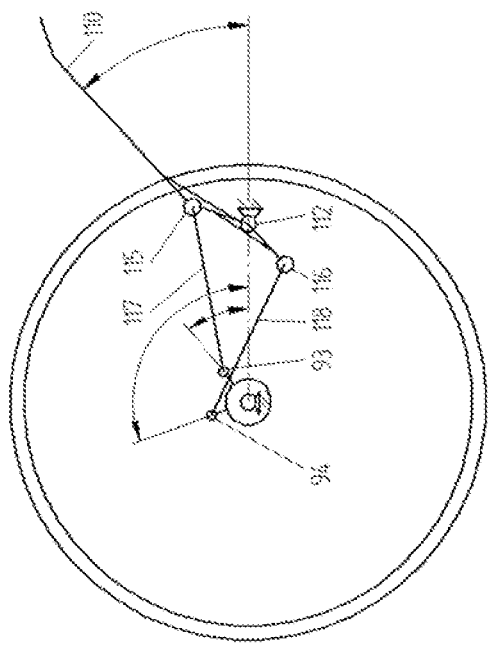
FIGS. 11*a* and 11*b* are sketches using second embodiment of the application of pulling rods.
Figure 11A:
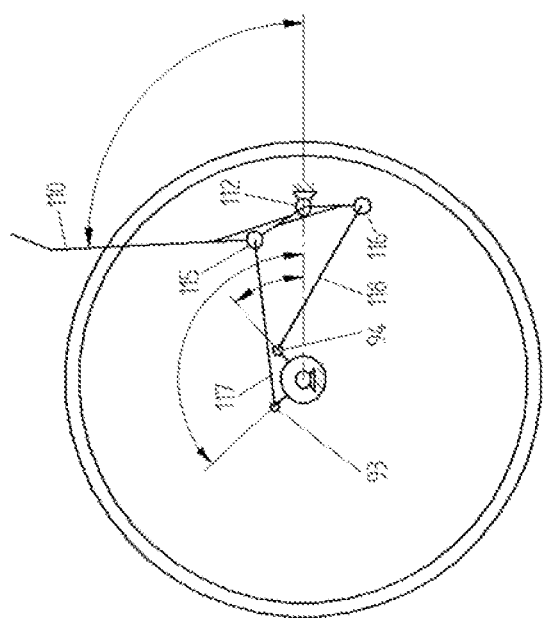

Finally, FIGS. 11*a* and 11*b* show a version of the embodiment shown in FIG. 9 using rods, in which the driving arm 110 is made as a doubled armed lever, i.e. the axis of rotation 112 lies again at a higher point. In this embodiment, both rods when they drive are exposed to pulling load, while in the embodiment of FIG. 9 the rod 118 was exposed to pushing load, and now the locking direction of the freewheels used should be identical.

The solutions shown in FIGS. 8*a* to 11 were shown because in use on a wheelchair the disabled subject can easier manipulate close to his/her hands in both forward and rearward directions. Depending on the nature of the health problem of the subject, either the higher or the lower position of the axis of rotation 112 can be preferred, i.e. it is more forward and lower or it is in middle height, or in case of such applications the drums 19, 20 can be made by a simpler design as there is no use for the special wound springs causing the drums to return after a driving motion. The wheel hub arrangement can therefore be realized in a simpler and cheaper way.

The invention claimed is:

1. A wheel hub arrangement for a drive with rotated drum to be used primarily for driving a wheel of a vehicle by a subject, comprising:
    a stationary shaft (13, 51) that can be fixed in a releasable way to at least one holding plate (11, 12) of the vehicle;
    at least one drum (19, 20) that has a hollow interior and is connected by bearings to the stationary shaft (13, 51) that can be turned in both directions;
    a wheel drum (32) constituting a hub of the driven wheel that comprises spoke-holding rims (34, 35) at both sides; and
    a driving connection established between the at least one drum (19, 20) and the wheel drum (32) that transmits forward rotation of the at least one drum (19, 20) to the wheel drum (32) and allows rearward turning thereof independently from movement of the wheel drum (32), said driving connection comprises at least a first freewheel (25), and a releasing mechanism that comprises a second freewheel (26, 57) that releases said driving connection of the wheel drum (32) with the hollow drum (19, 20) when the wheel drum (32) is turned in a backward direction,
    wherein said driving connection further comprises an inner sleeve (21, 22, 31, 54, 91, 94) which is coupled by bearings around the stationary shaft (51) and is arranged at least in part in the hollow interior of the at least one drum (19, 20) and in part at the wheel drum (32), and said bearings (23, 24) of the at least one drum (19, 20) and the first freewheel (25) are arranged between an outer mantle of the inner sleeve (21, 22, 31, 54, 91, 94) and the hollow interior of the at least one drum (19, 20), and a hollow, cylindrical interior of the wheel drum (32) comprises a ring (33) arranged in the cylindrical interior and connected in a fixed way thereto or made as a single piece therewith, and the ring (33) is guided through bearings around a section of the outer mantle of the inner sleeve (21, 22, 31, 54, 91, 94), and at least two cuts (38, 39) are provided in a portion of the inner sleeve (21, 22, 31, 54, 91, 94) which is under the ring (33), and the second freewheel (57) is arranged in an interior of the inner sleeve (21, 22, 31, 54, 91, 94) in an axial position corresponding to said cuts (38, 39), and in said cuts (38, 39) rock levers (40, 41) are arranged biased by springs (44, 45) and being pivotally fixed around pins (42, 43) bridging said cuts (38, 39), and one end of the rock levers (40, 41) is projecting into the interior of the inner sleeve (21, 22, 31, 54, 91, 94) and being supported in recesses (47, 48) provided on an outer ring of the second freewheel (57) and another end is abutting in one of a plurality of profiled recesses (46) provided in an interior of the ring (33) when the ring (33) and the wheel drum (32) connected to it in a rigid way are rotating in a forward direction, and when the wheel drum (32) is turned in the backward direction, the rock levers (40, 41) will get disengaged from the profiled recess (46) of the ring (33) by being turned by the recess (47, 48) of the second freewheel (57) that gets locked in that rearward direction, whereby engagement between the ring (33) and the inner sleeve (21, 22, 31, 54, 91, 94) gets released that allows free rearward rotation of the wheel drum (32).

2. The wheel hub arrangement as claimed in claim 1, wherein the wheel hub arrangement can be mounted between two holding plates (11, 12) and further comprises a respective driving drum (19, 20) at either sides, and the wheel drum (32) is positioned between the driving drums (19, 20), and the stationary shaft (51) comprises three interconnected tubes (16, 17, 18) lead through the interior of the drums (19, 20) and of the wheel drum (32), and the inner sleeve (21, 31, 22) also comprises three parts which are positioned on the three interconnected tubes and rotate together but can be separated from each other by axial displacement.

3. The wheel hub arrangement as claimed in claim 1, wherein a single stationary shaft (51) is fixed on a single holding plate (11) as a cantilever, and the at least one drum comprises a single drum (19) arranged at a side where the single drum is fixed, and the inner sleeve (54) is made of a single piece.

4. The wheel hub arrangement as claimed in claim 3, wherein the wheel drum (32) and the ring (33), being a sleeve (55), are made as two rigidly interconnected parts, and the wheel drum (32) can be pulled out from the ring (33) after a fixing connection has been released.

5. The wheel hub arrangement as claimed in claim 3, wherein, in an interior cavity of the inner sleeve (54) on the stationary shaft (51), an electric motor (61) is provided in part of a section defined between the second freewheel (57) and a cantilever-type support, and the electric motor (61) has a rotor (62) coupled to the inner sleeve (54) and lead out wires (64) lead through an interior of the stationary shaft (51).

6. The wheel hub arrangement as claimed in claim 3, wherein, in the at least one drum (19, 20) in a section between an end of the inner sleeve (21, 22, 54) and a fixing side, a wound spring (27, 28) is arranged, and a rope guiding path (29, 30) is provided along an outer mantle surface of the drum (19, 20).

7. The wheel hub arrangement as claimed in claim 3, wherein the wheel drum (32) is fixed by a releasable lock (56) mounted on the ring (33) at an outer part of the wheel drum (32) and fitted in a recess made in the ring (33).

8. The wheel hub arrangement as claimed in claim 3, wherein, on the single drum (19), an outwardly extending radial projection (95, 96) is provided in which a bore (93, 94) is made for receiving a pivotal pin of a driving rod.

9. A wheelchair having a large wheel (111) that is driven by the wheel hub arrangement of claim 8, wherein an axis of rotation (112) is provided at a predetermined distance in front of the large wheel (111), an driving arm (110) pivoting about the axis of rotation for displacement in forward-backward and reverse direction, with a first end of at least one rod (117, 118) coupled to the driving arm (110) through a pivot (115, 116), and a second end of the at least one rod (117, 118) is coupled by a pivotal connection to the bore (93, 94) provided on the radial projection (95, 96) extending out from the single drum (19).

10. The wheelchair as claimed in claim 9, wherein the axis of rotation (112) is fixed at a predetermined distance above a lower end of the driving arm (110), and has two rods (117, 118) having the respective pivots (115, 116) connected to the driving arm (110) at respective predetermined distances with opposite sense counted from the axis of rotation (112).

11. A wheelchair having a large wheel (111) that is driven by the wheel hub arrangement of claim 3, wherein, at a predetermined distance in front of the large wheel (111), an axis of rotation (112) is provided around which a driving arm (110) is pivoted for displacement in forward-backward and reverse direction, and at a predetermined height of the driving arm (110), through a respective pivot or pivots (115, 116), at least one driving member (113, 114) is connected, which is longer than a greatest distance between the axis of rotation (112) and the single drum (19) in the wheel hub arrangement, and ends of a stretched rope are fixed to ends of the driving member (113, 114), the stretched rope being wound with a predetermined number of turns around the single drum (19) associated with the concerned one of the driving members (113, 114).

12. The wheelchair as claimed in claim 11, wherein the axis of rotation (112) is fixed at a lower end of the driving arm (110), and has a pair of driving members (113, 114) which have windings with opposite sense wound around a mantle of the single drum (19).

13. The wheelchair as claimed in claim 11, wherein the axis of rotation (112) is fixed at a predetermined distance above a lower end of the driving arm (110), and has two driving members (113, 114) having the respective pivots (115, 116) connected to the driving arm (110) at respective predetermined distances with opposite sense counted from the axis of rotation (112).

14. The wheel hub arrangement as claimed in claim 1, wherein a single stationary shaft (51) is fixed on a single holding plate (11) as a cantilever, and two drums (19, 20) of the at least one drum are arranged adjacent to each other on a side where the wheel hub arrangement is fixed in a cantilever-type manner, and said bearings and a first freewheel (25) are arranged in the hollow interior of each drum of said two drums (19, 20), the inner sleeve (54) consists of a single piece, and the wheel drum (32) and the inner ring (33) are rigidly interconnected but made of two parts, and the wheel drum (32) can be pulled out of the ring (33) following release of a fixing connection.

15. A wheel hub arrangement for a drive with rotated drum to be used primarily for driving a wheel of a vehicle by a subject, comprising:
  a stationary shaft (51) having a first end that can be fixed in a releasable way to a holding plate of the vehicle;
  a drum (19) that has a hollow interior and is connected by bearings to the stationary shaft (51) and can be turned in both directions;
  a wheel drum (81) constituting a hub of the driven wheel that comprises spoke-holding rims at both sides, and
  a driving connection established between the hollow drum (19) and the wheel drum (81) that transmits forward rotation of the hollow drum (19) to the wheel drum (81) and allows rearward turning thereof independent from movement of the wheel drum (81), said driving connection comprises at least a first freewheel (25) and a releasing mechanism, which comprises a second freewheel (57) that releases said driving connection of the wheel drum (81) with the hollow drum (19) when the wheel drum (81) is turned in backward direction,
  wherein said driving connection further comprises an inner sleeve (54), which is coupled by bearings around the stationary shaft (51) and is arranged at least in part in the hollow interior of the hollow drum (19), and said bearings of the hollow drum (19) and the first freewheel (25) are arranged between an outer mantle of the inner sleeve (54) and the hollow interior of the hollow drum (19), guided through bearings around a section of the outer mantle of the inner sleeve (54), and at least two cuts are provided in a portion of the inner sleeve (54), and the second freewheel (57) is arranged in an interior of the inner sleeve (54) and a sleeve (55) is guided through the bearings around a section of the outer mantle of the inner sleeve (54), and at least two cuts are provided in a portion of the inner sleeve (54) which is under the sleeve (55), and rock levers (40, 41) are arranged in said cuts biased by springs and being pivotally fixed around pins bridging said cuts, and one end of the rock levers (40, 41) is projecting into the interior of the inner sleeve (54) and being supported in recesses provided on an outer ring of the second freewheel (57) and another end is abutting in one of a plurality of profiled recesses provided in the interior of the sleeve (55), when the sleeve (55) is rotating in a forward direction, and when the sleeve (55) is turned in the backward direction, the rock levers will get disengaged from the plurality of profiled recess of the sleeve (55) by being turned by the recess of the second freewheel (57) that gets locked in the rearward direction, whereby engagement between the sleeve (55) and the inner sleeve (54) gets released, and the wheel drum (81) is arranged on the stationary shaft (51) past an end of the sleeve (55) opposite to a first end for free rotation, and the adjacent lateral sides of the sleeve (55) and of the wheel drum (81) are connected with each other by a releasable driving connection.

* * * * *